L. B. HARVEY.
FIXED RIM AND LOCKING RING STRUCTURE FOR DEMOUNTABLE RIMS.
APPLICATION FILED AUG. 9, 1920.
1,399,961.  Patented Dec. 13, 1921.
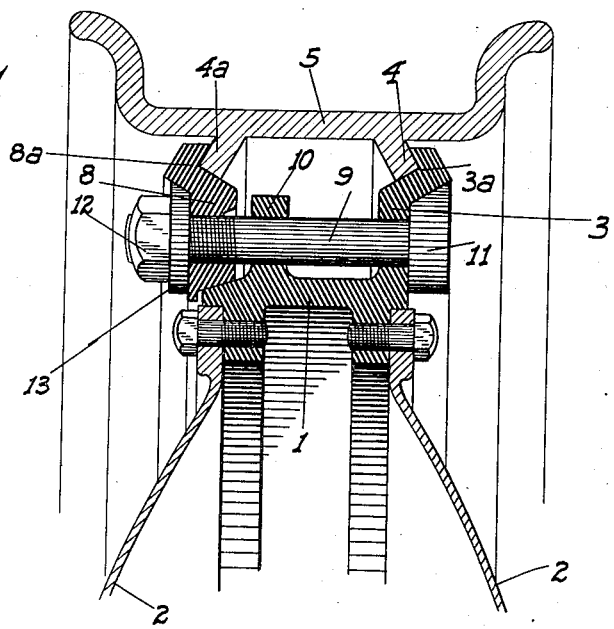
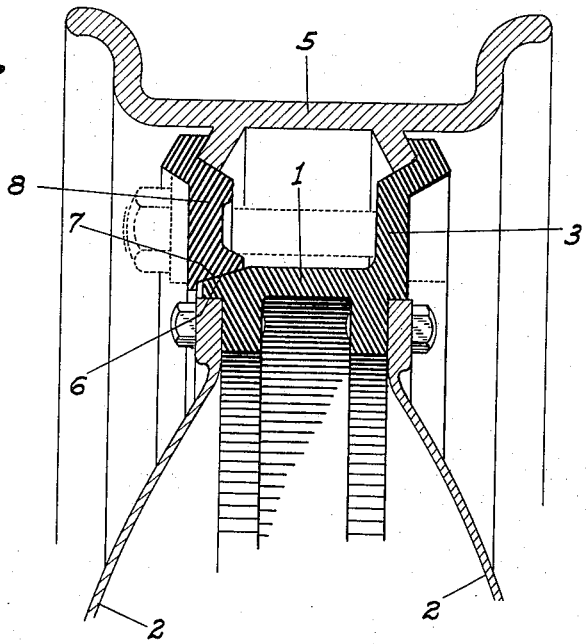
INVENTOR.
Louis B. Harvey
BY
ATTORNEY

UNITED STATES PATENT OFFICE.

LOUIS B. HARVEY, OF BUFFALO, NEW YORK, ASSIGNOR TO HARVEY RIM & WHEEL COMPANY, INC., OF BUFFALO, NEW YORK.

FIXED RIM AND LOCKING-RING STRUCTURE FOR DEMOUNTABLE RIMS.

1,399,961.  Specification of Letters Patent.  Patented Dec. 13, 1921.

Application filed August 9, 1920. Serial No. 402,079.

*To all whom it may concern:*

Be it known that I, LOUIS B. HARVEY, a citizen of the United States, residing at Buffalo, county of Erie, State of New York, have invented certain new and useful Improvements in Fixed Rims and Locking-Ring Structures for Demountable Rims; and I do declare the following to be a full, clear, and exact description of the same, reference being had to the accompanying drawings, to the characters of reference marked thereon, which form a part of this application.

This invention relates to improvements in the construction of wheels for motor vehicles intended to receive demountable rims thereon, the principal object being to provide a fixed wheel-rim and a locking ring coöperating therewith which will firmly hold and clamp a demountable rim in place thereon. Another object is to provide clamping bolts for the locking ring mounted to the fixed rim in such a manner that they will remain in proper alinement when the locking ring is removed, so that the latter may be easily slipped over the bolts when it is desired to replace said ring.

A third object is to so construct the fixed rim and the locking ring that the latter will be firmly wedged on to the rim when the bolts are cinched up, thus firmly clamping the two together and taking a great part of the shearing strain off the bolts. This structure is particularly adapted and intended to be used with that form of demountable rim shown in my copending application for Patent Serial No. 284,983, filed March 25th, 1919, and the wheel of which the fixed rim forms a part having disks instead of spokes.

A further object of the invention is to produce a simple and inexpensive device and yet one which will be exceedingly effective for the purposes for which it is designed. These objects I accomplish by means of such structure and relative arrangement of parts as will fully appear by a perusal of the following specification and claim.

In the drawings similar characters of reference indicate corresponding parts in the several views.

Figure 1 is a fragmentary cross section of the structure taken through one of the holding bolts.

Fig. 2 is a similar view taken intermediate said bolts.

Referring now more particularly to the characters of references on the drawings, the numeral 1 denotes the fixed rim to which the disks 2 of the wheel are secured, this being accomplished as set forth in my copending application for Patent Serial No. 402,078 filed Aug. 9, 1920.

The inner edge of the rim 1 is provided with an outwardly projecting flange 3 which at a point adjacent its outer periphery is adapted to engage a lip or flange 4 on the demountable rim 5 of the type aforementioned, as shown at 3ª. The outer face of the rim 1 opposite the flange 3 is beveled for a certain distance as at 6, being finished perfectly true and adapted to receive the similarly shaped and finished inner edge 7 of a locking ring 8, which adjacent its outer periphery but on its inner face is formed with a groove 8ª to receive another lip or flange 4ª on the rim 5 opposite to the flange 4. Thus the edge 7 and the innermost edge of the groove 8ª together form a wedge, so that when the locking ring is forced on to the fixed rim, a wedging action is had both between the ring and the fixed rim, and between said ring and the demountable rim.

To wedge the locking ring in place, I provide a plurality of bolts 9 which pass through the flange 3 and through lugs 10 projecting outwardly from the rim 1 and formed therewith, this member being preferably a casting. The heads 11 of these bolts bear against the outside of the flange 3, while the nuts 12 bear against washers 13 placed on the bolts between the nuts and the locking ring. Thus it will be seen that with this arrangement the bolts cannot drop or move out of alinement when the locking ring is removed and also nearly all shearing strain is prevented, since the wedging of the ring on the fixed rim provides a firm driving contact regardless of the bolts.

From the foregoing description it will be readily seen that I have produced such a device as substantially fulfils the objects of the invention as set forth herein.

While this specification sets forth in detail the present and preferred construction of the device, still in practice such deviations from such detail may be resorted to and do not form a departure from the spirit of the invention, as defined by the appended claim.

Having thus described my invention, what

I claim as new and useful and desire to secure by Letters Patent is:

In a structure of the character described, a fixed rim provided with an outwardly projecting flange adapted to receive one edge of a demountable rim, a locking ring arranged to rest on the fixed rim on the opposite side thereof from the flange, the contacting faces of said rim and ring being beveled, lugs on the fixed rim adjacent the beveled edge thereof, and bolts through the ring, lugs and the rim flange to force the locking ring into frictional and wedging engagement with the fixed rim.

In testimony whereof I affix my signature.

LOUIS B. HARVEY.